(12) United States Patent
Hanifi

(10) Patent No.: US 7,979,341 B2
(45) Date of Patent: Jul. 12, 2011

(54) DEALER TO DEALER SALES LEAD SYSTEM AND METHOD

(76) Inventor: Haris Hanifi, Centerville, VA (US)

( * ) Notice: Subject to any disclaimer, the term of this patent is extended or adjusted under 35 U.S.C. 154(b) by 0 days.

(21) Appl. No.: 12/120,054

(22) Filed: May 13, 2008

(65) Prior Publication Data

US 2009/0287595 A1 Nov. 19, 2009

(51) Int. Cl.
*G06Q 40/00* (2006.01)

(52) U.S. Cl. .................. 705/37; 705/1; 705/14; 705/38; 705/400; 463/40; 707/3; 707/104.1; 709/245

(58) Field of Classification Search ................ 705/1, 14, 705/37, 38, 400; 463/40; 707/3, 104.1; 709/245
See application file for complete search history.

(56) References Cited

U.S. PATENT DOCUMENTS

| | | | |
|---|---|---|---|
| 7,546,243 B2 | 6/2009 | Kapadia et al. | |
| 2002/0002614 A1* | 1/2002 | Murphy et al. | 709/226 |
| 2003/0069922 A1* | 4/2003 | Arunachalam | 709/203 |
| 2003/0195837 A1* | 10/2003 | Kostic et al. | 705/37 |
| 2004/0128262 A1* | 7/2004 | Nafousi | 705/400 |
| 2004/0162916 A1* | 8/2004 | Ryan | 709/245 |
| 2004/0267818 A1* | 12/2004 | Hartenstine | 707/104.1 |
| 2005/0055271 A1* | 3/2005 | Axe et al. | 705/14 |
| 2005/0273423 A1* | 12/2005 | Kiai et al. | 705/38 |
| 2006/0041500 A1* | 2/2006 | Diana et al. | 705/37 |
| 2006/0166740 A1* | 7/2006 | Sufuentes | 463/40 |
| 2006/0195385 A1 | 8/2006 | Khetrapal et al. | |
| 2006/0195428 A1* | 8/2006 | Peckover | 707/3 |
| 2008/0235043 A1* | 9/2008 | Goulandris et al. | 705/1 |
| 2009/0138378 A1 | 5/2009 | Suba et al. | |

OTHER PUBLICATIONS

"Auto Dealers Always Looking for Qualified Auto Financing Leads", Shenzen: Money Kind of City, posted on Jan. 18, 2010; 6 pages.*

* cited by examiner

*Primary Examiner* — Ella Colbert
*Assistant Examiner* — Sanjeev Malhotra
(74) *Attorney, Agent, or Firm* — Cahn & Samuels, LLP

(57) ABSTRACT

A system and method of creating a market for sales leads and financing amongst merchants of like wares that includes a central registry for receiving information about prospective buyers and their finances for compiling and communicating an anonymous sales lead including the prospective buyer's finances to merchants in the same line of business. The leads are auctioned or sold anonymously to interested merchants that receive the contact information for the prospective buyer but not the identity of the initial merchant.

1 Claim, 4 Drawing Sheets

DEALER TO DEALER SALES LEAD SYSTEM AND METHOD

I. FIELD OF THE INVENTION

The present invention relates generally to a secure market for the exchange of sales leads. More particularly, the present invention relates to a system and method, preferably computerized, for buying and selling sales leads in the car dealership industry.

II. BACKGROUND OF THE INVENTION

There are very few big purchases that a consumer makes in a lifetime as studied and deliberate as that of purchasing a car. As will be appreciated, once a prospective purchaser shows up at a car dealership, the decision to buy a car has been made and that individual expects to leave the dealership with a car. However, unlike other large purchases, such as that of a home, the purchaser of a car typically does not go through the step of getting pre-approval for financing prior to showing up on the car lot to buy a car. Despite the amount of time that may be spent pouring over literature or online material doing research in the decision-making process for the type and model of car to purchase, few prospective buyers know their credit rating and lendability prior to the time they show up at the dealership to buy the car.

Again, by the time a purchaser shows up on a car lot to buy a car, the decision to buy a car has not only been made, but also to at least to some extent, the capital necessary to put down a down payment and leave with a vehicle has been procured and is in hand. However, the resources and ability to qualify for, and secure, financing for the remainder of the car's purchase price from the dealership will not be known until the car dealer obtains the necessary information and paperwork from the prospective buyer and enters it into its financing system to get an indication of the buyer's creditworthiness.

As will be appreciated, not all prospective buyers will qualify for financing with a given dealership, for a given car, or for a given purchase price. In operation, when a prospective buyer shows up to a dealership with the definitive decision to buy a car, the realization that they do not qualify for financing and will not be leaving the dealership with a car can be quite upsetting. These individuals were set on purchasing a car and have been turned away by the dealer. Many of these individuals need a car and will at some point continue their efforts to obtain an automobile from another dealer or seek alternative financing. In any event, once a prospective buyer has gone to the penultimate step of coming to the dealership, it is unlikely that their desire or need to purchase a car will be deterred in the long run. But certainly in the short run, a dealer telling them they are not creditworthy and closing its doors to them will derail their immediate efforts to buy a car. This phenomenon is unfortunate because these individuals at this point in time are ready and willing customers for someone who will sell them a car. Buying is built on emotion, so timing is critical.

Presently, there does not exist a mechanism that allows other potential car sellers the ability to do business with those turned away by other dealerships absent those individuals coming directly to these alternative sellers on their own accord. Likewise, there does not exist a mechanism for car dealers that cannot, for whatever reason, finance these individuals to inform or steer them in the direction of other willing car sellers and, preferably, profit for their efforts in this regard. In addition, there does not presently exist a mechanism that allows prospective car sellers to identify and directly communicate with willing car buyers that have been recently turned away from other dealerships due to financing concerns but that would potentially qualify for financing from their dealership.

One prior artisan has attempted to devise a system to target individuals that have visited auto dealerships in the recent past in hopes that some of these people will still be in the market for car and will respond to a mailing. Specifically, a company called Virtual Lending Source has devised a system called "Trigger Leads." In operation, by teaming with a lender, the company is able to receive a list from credit bureaus each day with consumers that applied for automotive credit the prior day. The company compiles the list of "leads" into a data base searchable by zip code and then sells the leads to local car dealerships. The company then takes the contact information for these individuals and mails them an offer for credit from Virtual Lending Source or the car dealership or a combination of the two.

This system suffers from numerous drawbacks. First, for example, there is no way to know at the time of purchasing the leads if any of the consumers that had their credit pulled purchased a car that day or not. In other words, the consumer may already be in a car by the time they receive the mailing. Secondly, there is no way to know the specifics of the consumer's credit history at the time of purchasing the leads. The consumer may be an individual the dealership cannot finance but the dealership will not know until the consumer replies to the mailing. Thus, the purchase of that lead was for naught. Additionally, because of the national "Do Not Call" Registry, the system relies upon mailings to contact the consumer. The lag time in a mailing getting to the consumer, coupled with many people's aversion to "junk mail", suggests this method of pursuing leads is unlikely to be very effective. Many leads will be stale by the time the consumer is contacted. Again, buying a car is done on emotion, and timing is critical.

Although not necessarily analogous to the present situation, another prior artisan has proposed a system and method for providing sales leads to the sellers of complimentary goods. In US 2006/0195385, published Aug. 31, 2006, the named inventors provide a subscriber-based computer system that allows a seller to generate additional revenue from the sale of complementary products/services sales leads. The system also allows the provision of temporally-relevant information to customers to enable customers to obtain complementary products/services. This system suffers from a number of drawbacks. For example, the system is limited to leads on complimentary products or services.

In practice, a lead for a complimentary product or service is unlikely to prove fruitful. First, it is rare that the purchasers of a good are both in the market for a complimentary product and also have not already identified the business from which they intend to buy the product. Accordingly, the enthusiasm of complimentary lead sellers and complimentary lead buyers will quickly wane. After repeatedly preparing and marketing leads that result in no returns a lead seller will be disinclined to participate in the program. Likewise, as the cost of purchasing leads which yield no sales add up, all but the few successful lead buyers are likely to continue to purchase leads or renew their subscription to the lead service. Secondly, most companies or providers that have the potential to make sales of complimentary products will either start selling these products themselves or make strategic alliances with a few select complimentary goods/services providers and deal exclusively with them. An open market for leads for complimentary products is unlikely to pan out in the real world.

Another drawback to known lead selling systems such as that described in US 2006/0195385 is the fact that the lead buyer has no way of gauging both the interest of the consumer in its product offerings and the ability of the consumer to afford the purchase. In sum, the lead buyer has no way of knowing if the customer is someone worth attempting to do business with. This drawback is particularly acute when dealing with the sellers of high priced or high end products, such as automobiles.

The foregoing underscores some of the problems associated with prior art lead selling systems. Furthermore, the foregoing highlights the long-felt, yet unresolved need in the art for a lead system that allows a lead buyer to purchase a lead knowing that the customer is both in the market for the lead buyer's product and also a customer having the financial qualifications sufficient to attempt to transact business with.

Moreover, the foregoing highlights the complete absence in the art of a lead system that allows a seller dealing with a customer that he cannot or does not intend to transact business with to still profit from his efforts by identifying an alternate dealer of the same or like products/services willing to do business with that customer, whether for a fee, commission, or some other form of compensation on any consummated sale in exchange for the lead.

III. SUMMARY OF THE INVENTION

Various embodiments of the present invention overcome the practical problems described above and offer new advantages as well. One object of at least one embodiment of the invention is to provide a lead system that allows a lead buyer to purchase a lead knowing that the customer is both in the market for the lead buyer's product and also a customer having the financial qualifications sufficient to attempt to transact business with.

Another object of at least one embodiment of the invention is to provide a lead system that allows a seller dealing with a customer that he cannot or does not intend to transact business with to still profit from his efforts by identifying an alternate dealer for the customer willing to do business with that customer, whether for a fee or commission on any consummated sale.

Another object of at least one embodiment of the invention is to provide a lead system having a central authority for receiving leads from a lead seller and broadcasting the leads to potential lead buyers for auctioning or selling the lead to a lead buyer while maintaining the anonymity of the customer to prevent a lead buyer from attempting to transact business directly with the customer. It is a related object of the invention to have a central authority that also maintains the anonymity of the lead seller to prevent unscrupulous lead buyers from attempting to forge relationships directly with the lead seller to the detriment of the other lead buyers attempting to operate and bid fairly to win leads.

It is yet another object of the invention to provide a dealer to dealer sales lead system for the car sales industry that allows car dealers that cannot or will not provide financing to a given individual based upon their credit rating to offer that potential car buyer to other dealers who after receiving the financial qualifications or credit rating of that individual can buy, bid, or bargain for the identity or contact information for that individual. It is a related object of the invention to have a central registry for receiving the credit information or financial qualifications of an individual from the first car dealer and for soliciting other car dealers who may be willing to attempt to sell or finance a car to that individual.

According to one advantageous feature of the invention, the central registry keeps the contact information for the customer confidential pending the conclusion of the lead bidding or selling process. According to another advantageous feature of the invention, the central registry also keeps the identity of the car dealers confidential to prevent the dealerships from dealing directly with one another.

According to another object of the invention, the central registry requires a subscription for car dealers to have the privilege of giving and/or seeking leads. According to a related object of the invention, the central registry is able to track the sold leads to determine if, when and how much a dealer received from the customer in the car sale. In accordance with at least one embodiment of the invention, the sales information is used by the central registry to ensure that the original dealership providing the lead gets a commission based on the sale. In accordance with some alternative embodiments of the invention, the original dealership receives some or all of the purchase price of the lead from the alternative dealership. In an alternate embodiment, the central registry keeps some or all of the purchase price of the lead. In yet another alternate embodiment, the central registry is funded by the subscriptions sold and the dealerships are compensated by some or all of the price of the sold leads and/or provides a commission based on the revenue from a consummated deal.

According to another object of the invention, the central registry comprises a computer-implemented system. Preferably, the central registry comprises a database or computer software that is designed to store the data related to leads and route the lead information to the subscribers or participants in the dealer to dealer lead sharing system. In an alternate embodiment, the central registry may be an entity that collects lead-data from a first seller and communicates or posts at least a portion of the lead-data to other sellers in an effort to secure a buyer interested in doing business with the customer. Preferably, the central registry also tracks the leads and the consummation of any sales stemming from the purchase of a lead.

These and other objects and advantages of the present invention may be realized by one or more of the embodiments described herein. Given the following enabling description of the drawings, the novel lead systems of the present invention and their various respective advantageous features should become evident to a person of ordinary skill in the art.

IV. BRIEF DESCRIPTION OF THE DRAWINGS

The present invention is described with reference to the accompanying drawings. In the drawings, like reference numbers indicate identical or functionally similar elements.

V. DETAILED DESCRIPTION OF THE DRAWINGS

Figure 1:
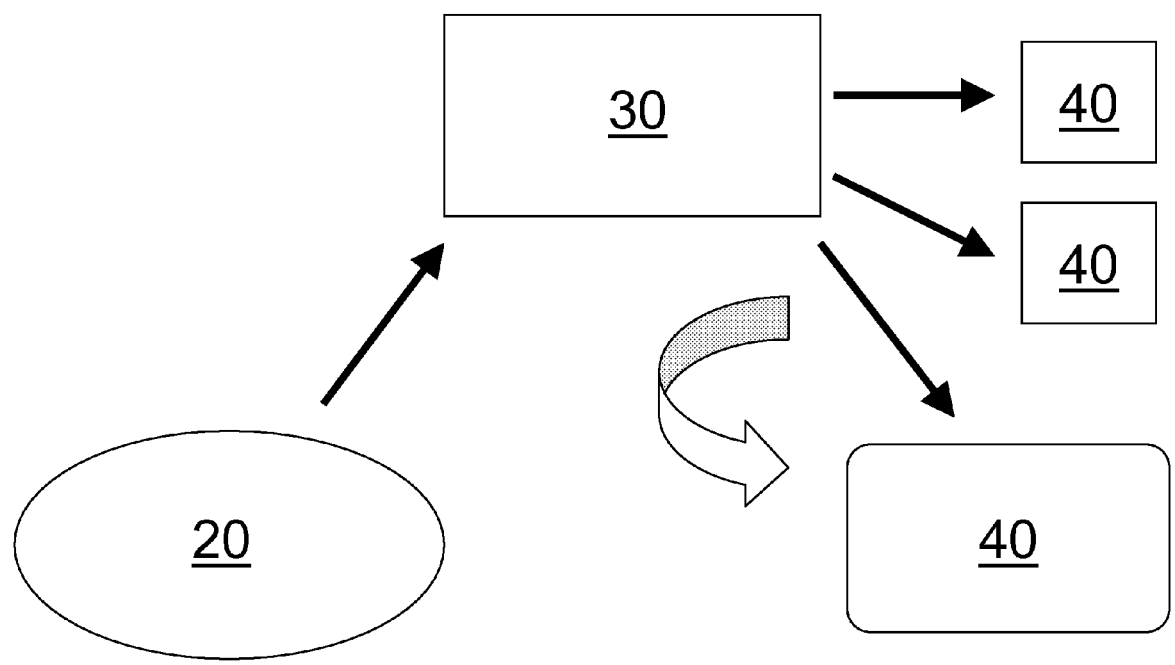
FIG. 1 illustrates a flow diagram of an embodiment of the invention for providing sales leads to the system.

The present invention is based, in part, on the recognition that a customer seeking to purchase certain goods and services has already made up his mind to make the purchase and is going to be undeterred from making the purchase unless and until a seller refuses to allow him to do so. In such situations, an alternative seller that would be willing to do business with that customer is in the ideal situation to attempt to make a sale to that customer. However, the ability of the alternate seller to learn the identity of that eager purchaser, and the purchaser's financial situation, has been impossible.

This phenomenon is particularly acute in modern American society when it comes to automobiles. As will be appreciated, when a person comes to a car dealership they expect to leave with a car. When they are informed that they are not going to qualify for the financing necessary to bring home their desired vehicle, the customer is often distraught and may be unwilling or unnerved from going to another dealership only to be turned down again. In this situation, the customer is extremely eager to buy a car but does not necessarily know where to turn. Alternatively, the customer may be in such dire need of transportation that they will go to every open lot until they find someone that will sell them a car, i.e., the single mother that has to get to work. If a system were in place that allowed other sellers to learn of these individuals predicaments, the sellers would be in a great position to contact this potential customer and secure a sale to either a potential buyer in dire need of a car or a potential buyer reluctant to approach the dealer. The present invention provides such a system.

While the present invention will be described in connection with a system and method for facilitating the sale of cars, it will be readily apparent to one of ordinary skill in the art that the present invention can be applied to a multiplicity of goods and services. In general, the present invention may be used in connection with creating an open (or closed) market for leads with respect to any goods or services requiring financial approval from a seller before the customer will be allowed to make a purchase from a given seller. In its most rudimentary form, the present invention allows a seller of a particular good having a determined customer that does not qualify for financing for one reason or another to provide the particulars of that potential customer's financials to other sellers of like goods to see if any of them would be willing to pay to get the contact information for that potential customer in an effort to make a sell to the customer.

As exemplified by the car industry and the automotive finance market, various car dealerships lose potential sales due to various systemic reasons. For example, in a first scenario common in the industry are those dealerships that have a corporate policy that simply will not allow them to finance a car to individuals that do not meet concrete credit requirements. Typically, luxury car dealers will not do business with customers that do not have a specific credit rating (e.g., greater than 600 beacons). The credit rating score is used as a bright line to gauge the risk for any given customer before any paperwork will even be submitted to banks for potential financing.

As is known in the industry, the paperwork is never submitted to the banks in this situation because the dealerships have strict Look to Book or "LTB" requirements with banks. In other words, if banks are looking at more and more deals but not booking many of the deals that the dealership sends them the bank's internal costs go up. Accordingly, certain credit scores are never even submitted to the banks. Notably, for present purposes, most car buyers do not know their credit score until they are at the dealership and find out the do not qualify for financing.

A second common scenario includes those dealerships that turn away potential car buyers because they simply do not have relationships with enough banks to assist in the financing needs of certain credit score ranges. These dealers will pull the credit report from a credit bureau and send it to the banks in its network only to find out that none of them will approve the loan. While these dealers have the merchandise and willingness to do business with people in this credit range, they simply do not have a means of closing a sale.

A third scenario often encountered in the car industry are those dealerships that do not have a knowledgeable or dedicated department that knows how to structure deals for "second chance" or "third chance" buyers having a suspect credit rating. Other common situations wherein a dealership loses potential sales include a fourth scenario wherein a dealership does not have cars at its disposal that would be suitable for individuals having weak credit ratings and a fifth scenario wherein the dealerships network of banks are not equipped to handle first time buyer programs or tax-id numbers.

The discussion above is not an exhaustive list of situations where dealers lose potential sales. While one of ordinary skill in the art can conjure up other scenarios that cost dealers sales, it will be readily appreciated that the present invention may be adapted or used to allow these dealers to reap some benefit by having met with a customer seeking to buy a car.

Figure 2:
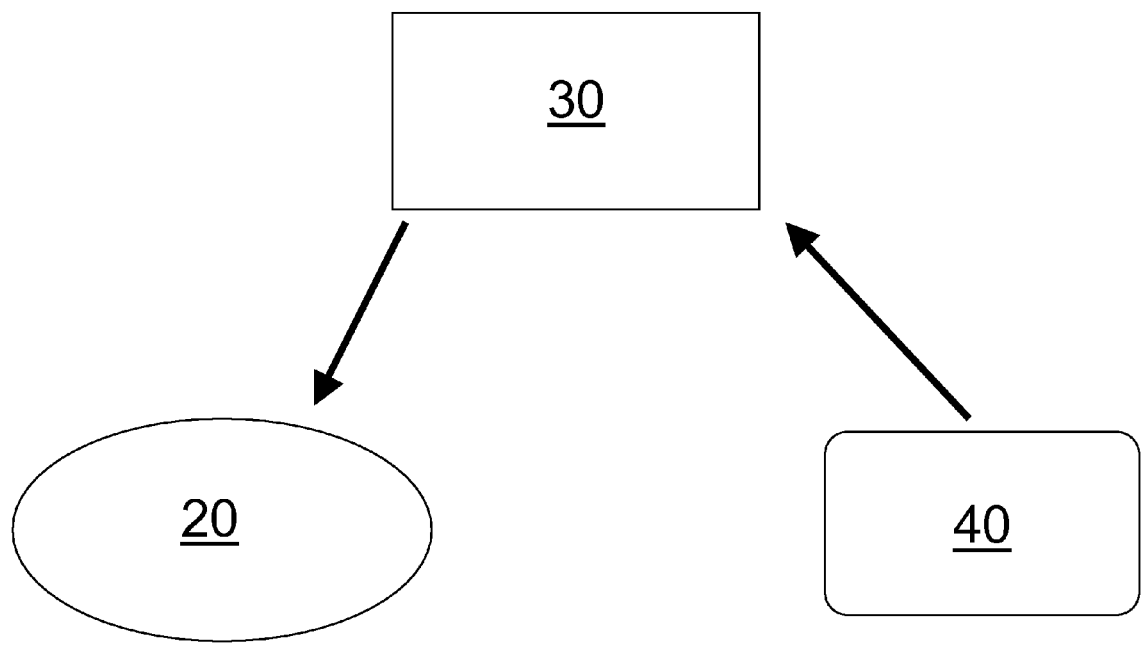
FIG. 2 illustrates a flow diagram of an embodiment of the invention for obtaining leads to the system.

FIGS. 1 and 2 depict a presently preferred embodiment of the invention. As shown in its most generic form, the basic system architecture comprises a deal giver interface 20, a central registry 30, and a plurality of deal seeker interfaces 40. According to this embodiment, as shown in FIG. 1, the deal giver interface 20 is configured to communicate with the central registry 30, which in turn, is configured to communicate with the deal seeker inferace(s) 40. Likewise, as shown in FIG. 2, the deal seeker interface(s) 40 is configured to communicate with the central registry 30, which in turn, is configured to communicate with the deal giver interface 20. The pivotal role of the central registry controlling the flow of communications to/from deal givers and deal seekers will be elaborated on below.

Figure 3:
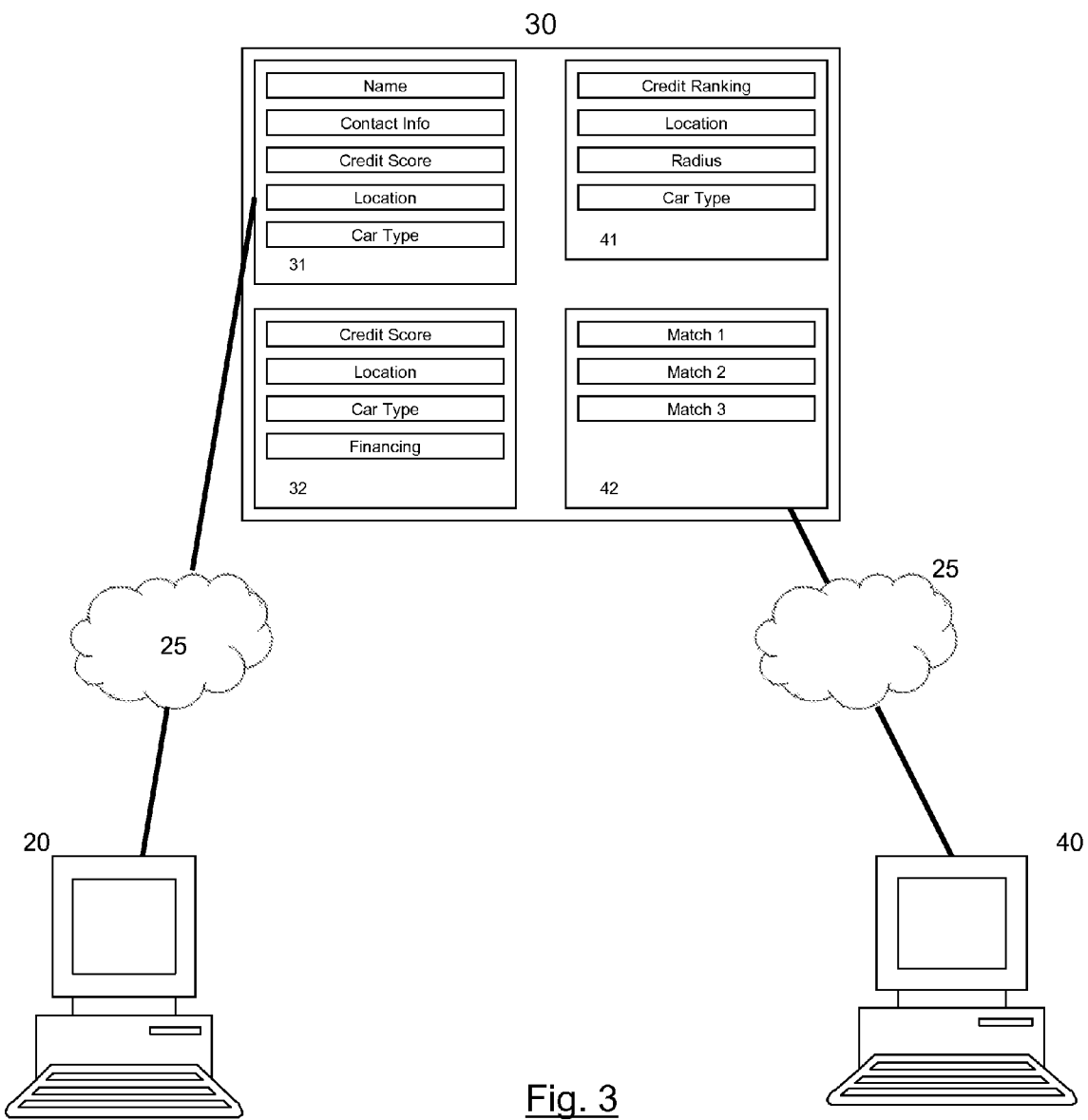
FIG. 3 illustrates a flow diagram of an embodiment of the invention for receiving information from a deal giver and providing leads to deal seekers.
Figure 4:
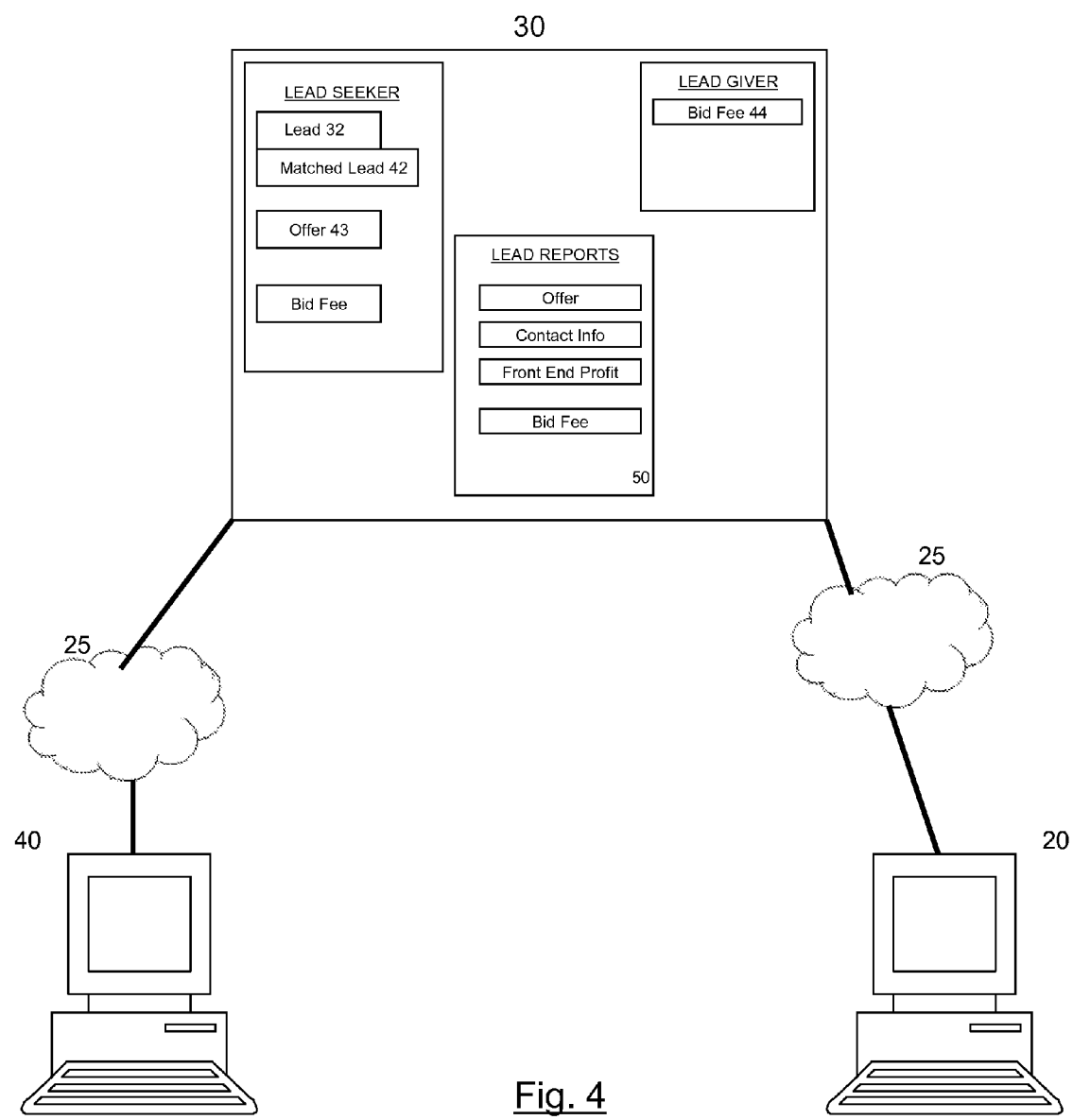
FIG. 4 illustrates a flow diagram of an embodiment of the invention for selling leads and tracking payments related to the sale of leads.

A more complex and fully-computerized embodiment of the invention is depicted in FIGS. 3 and 4. As shown in FIG. 3, the deal giver interface 20 is preferably a computer terminal or processor that is adapted to communicate with the central registry 30, which is also preferably a computer processor, via the Internet 25. With this configuration, a deal giver from a car dealership that is not going to do business with a prospective buyer can type, upload or otherwise transmit information about the prospective buyer, or buyer information 31, to the central registry 30 for processing. Preferably, the central registry 30 includes an interactive web site that allows deal givers to log onto the website to provide information in a secured manner from the deal giver interface 20 to the central registry 30. Alternatively, the central registry 30 and deal giver processors may have software that allows them or users of the computers to communicate (e.g., email). In another embodiment, special software may be downloaded from the central registry 30 (from its website) or provided as part of a subscription service or other validating process that will allow direct communication once installed.

Likewise, in other alternative embodiments, the central registry 30 and deal giver interfaces 20 communicate in a manner that allows information to be transmitted from the deal giver to the central registry. As will be appreciated by one of ordinary skill in the art armed with the present specification, the system may be adapted wherein the deal giver simply FAXes, emails, or telephonically communicates information about a prospective buyer to the central registry and allows the central registry to manage the information and solicit deal seekers. The manner of information flowing to/from the deal giver and the central registry may be of any suitable form consistent with the objects of the invention.

Preferably, the system will be configured to allow for a hierarchy of information to be provided by the deal giver about the potential buyer. The system will also preferably be designed to provide incentives to the deal giver to provide as much information as possible. While a deal giver is already motivated to provide strong and detailed leads in hopes of being compensated for them, the system may be configured to provide financial incentives for providing more detailed leads. To more fully illustrate this aspect of the invention, consider that financing is built on three foundations: ability, stability and willingness to pay. In order for deal seekers to weigh whether or not they want to pursue a lead, the deal giver must provide them as much information as possible about these foundations as they apply to the prospective buyer. In gathering information of value to the lead, the deal giver will want to ensure that critical information about the prospective buyer is communicated to the central registry for compiling the lead information. Otherwise the lead is of little value to prospective deal seekers.

According to one aspect of an embodiment of the invention, the deal giver is provided a template or interactive web site with fillable fields for providing information of interest to lead seekers. Depending on how much information is provided, the lead may be categorized, such as a "type 1", "type 2" or "type 3" lead, wherein the compensation for each level of lead varies with the most detailed leads commanding the higher compensation. The template or interactive website may be set up to prompt for information of interest to deal seekers such as, for example, the following template:

Ability
I. CREDIT SCORE
1. Equifax Score
2. Experian Score
3. Transunion Score
II. JOB TYPE
1. W2 Employee (Y/N)
2. Self-Employed (Y/N)
3. Job Gap (Y/N) How much gap?
4. Income Amount
   a. Gross:
   b. Net:
   c. Paid Weekly/bi-weekly/monthly:
III. Down Payment Amount?
Stability
IV. Time of Residence
1. Renter (Y/N); Amount?
2. Homeowner (Y/N): Amount?
V. Time on the Job?
Willingness to Pay
VI. Bankruptcy (Y/N)
1. DIscharged? (Y/N)
2. When? Date 00/00/0000
VII. Trade-In? (Y/N)
1. Paid-off? (Y/N)
2. Amount Still Owed?
Banks Submitted:
Call Back 1
1. Loan to Value (LTV) ?
2. Amount Financed?
Call Back 2
1. Loan to Value (LTV)?
2. Amount Financed?
Interview Customer?: (Y/N)
Notes Section:

In an alternative embodiment of the invention, information related to prospective buyers is collected automatically at the dealership and communicated to the central registry for further processing. In a presently preferred configuration of this aspect of the invention, software is installed at each participating dealership whereby information entered into the system using the computer terminals at the dealership is stored and accessible or communicated to the central registry. For example, a dealership using HigherGear or other tracking software may be configured to allow the central registry to receive or access the entries in HigherGear at each participating dealership. Thus, once any information is entered into a local dealer's system relating to a customer or a car (tracked by VIN number), the central registry receives or can access the information. As will be appreciated, the ability to directly access information from the dealerships' internal systems will speed the collection and posting of leads, as well as allow the central registry to track the progress of leads at other dealerships and the financials terms of any sales. Accordingly, the validity and accuracy of the data is ensured, as well as the veracity of a lead seeker's claim to the financials (including front end gross and back end gross) of consummated sales from leads.

Turning back to FIG. 3, the central registry 30 preferably comprises computer software or a database for accepting, sorting, processing, and/or storing information provided by a deal giver in some manner so that some or all of the information, hereinafter called a "lead" 32, may be presented to deal seekers via the deal seeker interface 40. In a preferred embodiment, the deal seeker interface 40 is also a computer terminal or processor in communication with the central registry 30. The central registry 30 in turn is configured to communicate sales leads 32 to one or more (or all) of the deal seeker interfaces 40 in any suitable format. For example, the central registry may send an email having the sales lead information to all of the members of the deal seeker registry. Alternatively, the central registry 30 may process the sales lead information and only communicate it to deal seekers matching predetermined criteria, such as the zip code of prospective buyer or deal giver dealership, radius from deal givers dealership, credit score range, etc. Any information entered into and accepted by the central registry 30 may be compiled into a database and sorted according to the entered criteria for determining which leads are to be sent to which deal seeker interfaces based on matching criteria preferences. In yet another alternate embodiment, the leads may simply be posted on a bulletin board for perusal by deal seekers that initiate a bid or purchase of the lead.

In a preferred embodiment, the preferences of the deal seekers may be entered or stored in the central registry 30 as part of a subscription service. The compiled deal seeker data record 41 preferably includes an indication of the criteria for receiving leads. The deal seeker data record 41 and criteria for receiving communications on specific leads may then be managed by the central registry or, alternatively, by the deal seekers themselves. For example, the deal seekers may be able to log onto a website of the central registry and access their own account data record and then view their preferences to change, alter, or update what information in the database that matches leads will trigger future leads being supplied to the specific deal seeker by the central registry. Likewise, deal givers may be able to access the system to manage their accounts or provide buyer information for the creation of lead records.

The leads in the system that match the preferences of a deal seeker, namely a matched lead 42 for simplicity, may be sent to the deal seekers automatically via email or the like if there is a match in predetermined criteria using an appropriate computer program. Alternatively, the matching of leads with appropriate deal seekers may be done manually and communicated via an operator using facsimile or email to contact the deal seekers. As shown in FIG. 3, once there is a matched lead 42 identified by comparing a lead record 32 with the preferences of a deal seekers' data record 41, the central registry 30 may communicate via the Internet 25 to supply the matched lead 42 or lead record 32 to the deal seeker interface. While the terms lead 32 and matched lead 42 are used to express different concepts, it should be understood that the storage and communication of the information comprising the lead is the undertaking of the present embodiment.

It is not intended and the present application should not be construed as requiring a database of leads and a separate data base of matched leads, although such is within the scope of the invention. For example, in alternate embodiments, the leads may simply be posted on a bulletin board that may be searched by deal seekers who then in turn contact the central registry to buy or bid on the lead. In any event, what is intended by the illustrations is simply the concept that the lead does not include the identity or contact information for the prospective buyer (to prevent a lead seeker from circumventing the system).

As shown, the system in some embodiments is designed to allow the lead records to be searched and compared to deal seeker preferences to ensure that only leads that fall within the predetermined criteria of the deal seeker is communicated to them. Developing a computer program to provide for the communication, storage, and sorting of information to carry out the present invention is well within the ability of one of ordinary skill in the art and will not be elaborated on further herein.

In addition to automatic computer sorting of buyer information and generation of leads 32 or matched leads 42, the central registry 30 preferably is configured to receive information from the deal seekers, such as bids, to determine which one or ones of the deal seekers will be provided the contact information associated with the respective lead. Alternatively, the receipt of bids, the conducting of an auction, or other interaction between the deal seekers and the central registry can be done by other means. For example, deal seekers could email a person associated with the central registry for soliciting more information, updating a bid, or transmitting payment information. Also, FAX or telephonic means may be used to track bids and auctions to determine which lead seeker or seekers will get the contact information. Likewise, someone at the central registry may use email, FAX or telephone to communicate price and lead information to specific deal seekers. In yet another alternate embodiment, the central registry simply maintains a database of information about prospective buyers that deal seekers can search to determine what leads they want to purchase or pursue from the central registry.

In a presently preferred embodiment, depicted in FIG. 4, the central registry 30 plays a pivotal role in the tracking of leads and managing the financial transactions between deal seekers and deal givers. As depicted, once the architecture is in place for the central registry 30 to receive buyer information 31 via the Internet 25 from a deal giver 20 for transmission via the Internet 25 to deal seekers 40, the central registry 30 may also be used as the conduit through which payments are made or tracked for the leads. Alternatively, a third-party interface to the central registry such as PayPal may be used.

In a presently preferred embodiment, a deal seeker that has account preferences that matches a criterion communicated to the central registry about a prospective buyer is sent the lead. The deal seeker then either pays a predetermined price for the lead, makes an offer for the lead, or participates in an auction with other deal seekers for the right to the lead. For illustrative purposes this will be termed generically as a lead seeker's "offer" 43.

In a preferred embodiment, the contest for leads is conducted on-line. A deal seeker receives a lead 32 or matched lead 42 and through the deal seeker interface 40 communicates an offer 43. The bid or offer 43 is received at the central registry 30 where it is either accepted rejected or entered. The central registry 30 preferably communicates the status of the bid or offer to the deal seeker through the deal seeker interface 40 so that further offers or bids can be made if necessary or allowed, or, more importantly, so that payment for the lead can be attended to.

Regardless of which of the foregoing or other financial mechanism is used to decide the dollar figure and winner of the lead, the central registry will collect the fee from the deal seeker. The fee may be collected by any suitable means, including account billed periodically, direct payment over the Internet or secured payment via Pay Pal or the like, wire transfer etc.

The fee collected by the central registry is then processed and provided to the deal giver according to the terms of service. In some embodiments, the deal giver may receive an upfront payment from the central registry for each lead sold. In other embodiments, the deal giver may receive a percentage of the sales price of the lead from auction or the like or a percentage of the ultimate sales price of any sale consummated by the deal seeker stemming from the lead. With respect to the car sales industry, the ability to determine the actual sales price of an automobile to a person is attainable. Alternatively, the deal giver may receive compensation based on any combination of the foregoing. The precise commission scheme may be varied depending on the nature and field of use of the present invention to achieve optimal participation by deal givers and deal seekers.

In a preferred embodiment, the central registry 30 is configured to store for the lack of a better term, "lead tracking records" or "lead reports" 50. Lead reports 50 are compiled by the central registry 30 upon receiving information relating to individual leads 32. Ideally, the lead reports 50 will include the contact information for the deal giver 20 and the winning deal seeker 40, if any, and perhaps the identity of other compatible deal seekers incase the lead is reposted because the winning deal seeker 40 fails to make a sale. The lead report 50 also includes information related to the amount of the winning bid, tracks whether the bid fee 44 has been paid to the registry, and whether the flat fee has been paid to the deal giver. Also, in a preferred embodiment, the lead report 50 includes the amount of the front end profit, respective percentages for the participants and whether they have been paid or not, and the sales price of the car so that any remuneration due from the consummated sale can be tracked as well. The foregoing is not meant to be exhaustive but rather an example of how the central registry may be used to manage the buying and selling of leads. However, it should be understood that one of ordinary skill in the art armed with the present invention can configure a system that tracks the information related to leads in any suitable manner to ensure the goals of the system and its operation are met.

An advantageous feature of embodiments of the invention wherein the central registry manages the receipt and communication of information to and from deal givers and deal seekers is the ability to maintain the anonymity of all of the participants. Anonymity is desirous in these embodiments because it allows the market to operate efficiently. In the absence of anonymity, unscrupulous participants may upon learning the identity of the prospective buyer attempt to circumvent the system and get that buyer to their dealership without compensating the deal giver; may upon learning the identity of the deal giver attempt to circumvent the system and set up a referral relationship directly between themselves; and/or may upon learning the identity of deal seekers attempt to set up their own lead auction on the side. In any of these situations, the growth of the system and the interest of participants will be adversely affected. Likewise, in any of these situations, the ability of the central registry to command a fee, whether a subscription fee from participants or a percentage of revenues from lead purchases and/or consummated sales, is greatly damaged.

In implementing the present invention for use in the car industry, there are at numerous methods of buying and selling leads to consider such as: 1) a bidding (or auction) service, 2) a non-bidding (or flat fee) subscriber-based service, and/or 3) an open market buy-now, first come/first served service. While these three exemplary methods are self-explanatory, it may aid the adaptation of the present invention to other fields and uses by those of ordinary skill in the art through an explication of these methods in view of the dynamics of the car industry.

In the car sales industry, the total gross profit on the sale of a car includes the front end gross, or profit made on the sales price of the car over the cost of the car, plus the back end gross, or profit made on items other than the car itself, including products such as warranty, GAP, life and health insurance, and holding points with the bank on the loan or any other products. To calculate and track the front end gross of the car you need to know the price the car was acquired for and the price the car was sold for, including the down payment and amount financed. To calculate and track the back end gross of the car you need to know other terms of the sale and understand that many of these are cancelable, resulting in "charge backs" that reduce the back end profit.

Absent the ability to access all of the information from the cost of the car, the terms of the sale, the terms of the bank loan, and the disposition of the cancelable items, one cannot fully and reliably know the ultimate total gross of the sale. Such difficulties counsel away from setting up a commission based system for use of the present invention with the car sales industry. However, since most car dealerships include computerized systems that track all of these details of the vehicles and their sale, the lead selling system of the present invention could be configured to access, communicate, or otherwise receive the data of the internal systems of the dealerships and lending institution (or otherwise insure the validity of the information reported to the central registry) such that the commission method in which lead givers are compensated could be used and include, for example, a percentage of the front end gross and a percentage of the back end gross be paid to the deal giver.

Unfortunately, the ability of the central registry and/or deal giver to know the total profit on a car sale stemming from a lead is questionable and maybe impracticable as discerned from the foregoing. While the deal giver and/or central registry by virtue of knowing the identity of the lead could contact them to find out if they bought a car and what they paid, the profit made by the deal seeker will be difficult to figure out since auction slips are unavailable and the deal seekers can report an inflated cost price of the car, increase pack, or report increased additional costs to the car. The system would have to allow the central registry to access a feed of the deal seekers inventory through its DMS or like system and track the other terms of the deal through VIN # to know the financials of the cost and profit on the car. The system would probably need to allow for the bank's records also be collected or verified to insure the reliability of a reported profit. Use of a commission based system for consummated leads is within the scope of the invention and may lend itself to ready implementation in other fields and industries but is not the preferred embodiment of the present invention when it comes to the car industry for the reasons mentioned above.

In a presently preferred embodiment, whether or not a lead ultimately results in a sale, and the financials of that sale, are irrelevant to the operation of the market for leads. In this embodiment, the leads are put up for auction, wherein deal seekers having reviewed the lead information place a bid for the right to pursue that perspective customer. The system may be configured to allow the auction to proceed for a given length of time, wherein the winning bid is the highest bid at the conclusion of the bidding window. The lead seeker with the winning bid then pays the central registry the amount of the bid, and the central registry assumes the responsibility of paying the deal giver a predetermined amount of the money. By using this method of compensation, the central registry does not need to involve itself in the business of the deal seekers (e.g., dealer's profits, financials, business methods, internal systems, record keeping, DMS system, etc.) which would have been a deterrent for many dealers to participate in the system.

An advantageous feature of at least one embodiment of the system is the ability to re-list a purchased lead that did not result in a sale. In this scenario, the deal seeker that purchased the lead is now the deal giver. The system allows the free market for the lead to continue through auctions and re-postings until the lead's life span expires, e.g., its value reaches zero. Preferably, the lead will be re-listed and identified or identifiable as a previously unsuccessful lead so that deal seekers do not find themselves purchasing stale leads and becoming disenchanted with participating in the market provided by the system of this embodiment of the present invention. At this point, the leads may be of particular value to "Buy-Here-Pay-Here" dealerships for even with the present invention the old adage holds true that "one man's garbage can be another man's treasure."

In an alternate embodiment of the invention that lends itself to ease of use and implementation is a flat-fee, first-come/first served system. In accordance with this embodiment of the invention, the system provides a means of communicating leads to lead seekers who then purchase the leads for a flat fee on a first-come/first-served basis. One advantageous feature of this embodiment of the invention is the ease of configuring the system and transactions by not having the back-and-forth communications and lag time involved in an auction. Also, the system may also dispense with the need to track leads since the leads are purchased for a flat fee. In this embodiment, leads could also be re-posted as in other embodiments so that the purchaser of the lead could recoup some or all of its costs in pursuing a lead that did not result in a sale.

In yet another embodiment of the invention, the system makes use of a subscription service and ranking means for members to facilitate placing a prospective customer with a dealer that is more likely to be able to close a deal with the customer. In this embodiment, the central registry has different membership levels based on predetermined quantifiers. Based on the quantifiers, the central registry determines which of its subscribers best suits the customer and then is offered the lead. Quantifiers may include such data as the number and types of banks in its system, the profile of buyers it can service, and the location of the dealer relative the customer. With this embodiment of the system, the central registry strives to serve the prospective car buyer through a match-making function. Many buyers turned away from a dealership may welcome the help in finding a car dealer willing to finance them a car. Further, another advantageous aspect of this embodiment of the invention that may be implemented in the system is the provision of more than one choice to the buyer, wherein the buyer decides which, if any, of the dealerships it wants to visit. In essence, the lead is sold to multiple dealerships and the customer sifts through and decides whom to do business with. This aspect of this embodiment of the invention overcomes the drawbacks of mailings from the Virtual Lending Source and the like in that the lead is still a hot lead when the system communicates with the prospective buyer.

In an alternative embodiment, the system may be configured to allow dealers to purchase enhanced subscriptions to ensure that they get the best and freshest leads. This system may be advantageous from a supply and demand economic perspective if the system becomes overwhelmed with bidders vying for leads, e.g, you have to pay more for a subscription that allows you to bid or buy leads early to reduce the number of communications coming in to the system.

According to another advantageous and customer-friendly aspect of various embodiments of the invention is the configuration of the system in a manner that keeps the dealerships from directly contacting the prospective buyer. Although the customer could waive its listing on the national "Do Not Call" Registry for the purpose of receiving calls from deal seekers, at least some customers are unlikely to welcome this intrusion. To solve this dilemma, the system may be set up such that a customer agreeing to participate in the system receives a customer number and the contact information for the deal seeker or seekers purchasing the lead. The customer may then show up at the deal seekers dealership and present their customer number and the dealer will know that the person is the identity of the purchased lead. Alternatively, the system may be set up wherein the customer is given a 1-800 voice mail number and box set up by the central registry. The customer can call and check voice mails left for them in their box from the deal seeker or seekers purchasing the lead and decide whom and when to contact regarding their car needs. In yet another alternative embodiment, the winning deal seeker or seekers provide information about themselves or their offers to the customer to the central registry via email, FAX, or the like, and the central registry forwards or communicates the contents of the communication to the customer. The customer then decides on his own accord whether or not to follow-up on the offers. In yet another embodiment, the customer may be provided with a phone number at the dealership to record a message waiving the "Do Not Call" prohibition as to dealers that have purchased the lead in addition to a signed waiver to allow the deal seekers to immediately contact the customer without fear of being in violation of the terms of the Do Not Call list.

In configuring a computer-implemented embodiment of the invention, a presently preferred embodiment emphasizes ease of use for the participants. For example, upon accessing the central registry's website, the user is brought to a first page that has two boxes, one labeled "Deal Giver" and the other labeled "Deal Seeker." Preferably, the computerize system will also include a "My Account" page wherein deal givers and/or deal seekers can manage their accounts with the system. The deal givers should be able to track things such as how many deals they submitted, if there were bids submitted for their leads, and how much they should expect to receive from the central registry when it settles the account balance at the end of the month. The deal seekers should be able to track things such as how much they have spent on bids and, in some embodiments, their preferences for receiving bids from the central registry.

From the first page, if the "Deal Seeker" box is clicked, the user is brought to a second page having a database "search" function. While the search function may allow all of the entries in the lead database to be searched, the system preferably defaults to a "Search by Zip Code" or "Search by Radius" function wherein the user enters a zip code or a number of miles and the leads corresponding to the entry appears in a list on the screen. The deal seeker may then click on respective leads in the list to access the lead record. The lead record pages preferably include a "Bid" button at the bottom which will bring up another box wherein the lead seeker can enter the amount he wishes to bid for that lead. The bid is received by the central registry and processed via the auction, flat fee, or other methods described previously herein.

From the first page, if the "Deal Giver" button is pressed, a second page having fillable fields for each of the items in the lead database is presented wherein the deal giver enters as much information as possible for construction of a lead by the central registry such as that previously discussed. The page also preferably includes a "Notes" box wherein textual information relating to the lead may be entered or pulled from a drop down menu. The notes box allows the deal giver to indicate the type of car the person may be interested in, etc., and is preferably searchable by the deal seekers. If a drop down menu is used, it should include entries such as "Reposting" and the like to let deal seekers learn more about the lead and its potential value.

In one embodiment, re-posted leads or leads that have reached an expiration point of a predetermined time (e.g., 12-24 hours) and no longer considered "hot leads" may be tagged or noted as being "Buy-Now" leads that may be purchased on a first-come/first-served basis for a predetermined flat fee. As will be appreciated, even these somewhat stale leads will be valued by at least "buy-here-pay-here" dealers that finance their own paper when no one else can get these buyers done.

As an added feature to maximize the profit from leads, the system may be set up such that in the event that leads become old, the central registry will make a sale of bulk leads to a mass mailer. This will allow the central registry to cleanse the system and make the database more manageable while also serving as a source of additional revenue. Notably, since credit scores can change every 60 days, old leads may still be of value, however minimal, to someone looking to participate in the sale of cars. As will appreciated by one of ordinary skill in the art, the system corrects many, if not all, of the inefficiencies existing in the car sales market by touching every dealer and every marketer that can profit from knowing the identity of someone in the market for a car.

In reviewing the foregoing, it should now be clear to one of ordinary skill in the art that the present invention not only provides many advantageous features but also addresses many of the drawbacks and fulfills many of the needs existent in the art. For example, take the first scenario described above wherein an expectant car buyer comes to a car dealership that does not do business with customers having low credit scores. In this situation, the dealer gets background information from the customer and submits it to a credit bureau to ascertain the customer's credit rating. In some situations, the credit rating, if below a predetermined threshold level, is enough for the dealer to turn the customer down and no information is submitted to any banks. Rather than lose all remuneration for having met with an eager buyer, the dealer may use the system to be a deal giver of a hot lead for other dealers. The deal giver then uses the deal giver interface 20 to provide information about the eager buyer to the central registry 30 via an interactive website or otherwise.

The central registry is configured to store the information about the buyer and provide an anonymous lead to dealers that are authorized users of the registry. In one advantageous embodiment, the information about the buyer is culled to develop a database of information for the lead. The information in the database is then searched to find matches within a database of deal seekers that are interested in receiving leads from buyers meeting certain predetermined criteria. For example, leads from potential buyers within a certain geographic area, or buyers having certain credit scores, or buyers interested in buying a certain type of car. One of ordinary skill in the art will appreciate that any useful information from a prospective buyer, or information deal seekers may want to know, may be entered into the system. Likewise, any information relevant to the decision to pursue the buyer may be also stored and searched with the present system to ensure meaningful leads are provided to suitable deal seekers.

The central registry then communicates the lead and the relevant information for the deal seeker to make the decision whether or not the potential buyer appears to be a promising candidate for its financing infrastructure or not. In an alternate embodiment, the system may be set up in a manner that allows deal seekers to search the central registry's database of leads and then decide which, if any, of the leads it is interested in and then they contact the central registry to purchase or bid for the identity and contact information of the lead. In other words, the central registry does not make the decision of which deal seekers to contact based on buyer information, rather the deal seekers decide on their own what criteria about a prospective buyer peaks their interest and what leads they want to pursue.

Once a deal seeker procures the lead and gets the identity of the prospective buyer, the deal seeker contacts the prospective buyer and lets them know that his dealership does do business with customers in their credit score range and has the infrastructure and staff for handling the customer's financing and merchandise needs. The deal seeker then contacts appropriate banks or takes whatever necessary steps remain to get the eager buyer into a car. Once the car is purchased the deal is done.

In accordance with one preferred embodiment, the deal seeker will allow only the central registry to see how much was made on the front end of the deal. Based on the front end profit, the central registry will take a predetermined percentage of the profit, and keep a portion for itself, and then provide the deal giver with a flat fee for the successful lead. By having the central registry manage the communications and financial information, the anonymity and confidentiality of the various components remains intact. The flat fee the deal giver receives from the central registry will allow the terms of the sale the deal seeker negotiated for the car to remain a secret from the deal giver. Also, the deal giver will have no way of knowing which deal seeker sold the car. As will be appreciated, this heightened confidentiality will allow deal seekers to keep their company trade secrets and successes from their competitors. As an added feature to ensure the integrity of the system, the central registry or the subscription agreement may provide for fines, penalties, or expulsion of dealers that are untruthful in reporting the terms secured on successful leads. In embodiments where the central registry does not have software to track the financials of the deal seeker, the system may require deal seekers to provide access to their internal systems and financial tracking services such as their "Reynolds" or "ADP" system.

To further illustrate the usefulness of the present invention consider the second scenario discussed above wherein a dealership does not have enough banks to assist in the financing of customers having certain credit score ranges. In this situation, the deal giver has pulled the customers credit report from a reporting bureau and submitted it to its network of banks via DealerTrack, RouteOne, or other means of transmitting such information as is common in the trade. However, as is common in this scenario, the deal giver has been turned down by the bank or banks upon which it has attempted to "hang the paper." Rather than let the customer go, the present invention provides a means through which the deal giver can provide the customer information to the central registry for the generation and posting of a lead.

In a preferred embodiment, deal seekers will learn the dynamics and specifics of the lead as it was submitted to DealerTrack, RouteOne, or other like system, and be able to determine if the customer fits one of the banks in its own network. At this point, the deal seeker may attempt to pursue the purchase of the lead to contact the customer and let them know that they think they can sell him a car. Again, once the deal seeker gets the customer in a car and off the lot the deal is done. The specifics of the deal are reported to the central registry so that the central registry and the deal giver can receive their remuneration for participation in a successful sale.

The present invention may also facilitate successful sales in the third scenario discussed above. In this scenario, the deal giver is a new car dealer or used car dealer with minimal second and third chance financing experience or a "buy-here-pay-here" dealer that does not have any bank relationships but rather is financing its own paper, i.e., the car. Typically, the cost to maintain a second and third chance financing department is very high for new car so they chose not to do so. The present invention provides a means for these dealers to profit from having dealt with credit challenged prospects. Likewise, the present invention provides a mechanism for a cash only dealership to profit from a hot lead and eager buyer that they are unable to put into a car. As will be appreciated, the value of an eager buyer and hot lead in the car selling industry is enormous. Most dealerships spend a lot of resources in media advertising and canvassing neighborhoods through focused circulars in an attempt to reach an eager buyer and get them to their lot as opposed to that of a competitor. The efficiencies and raised profitability of deal seekers in not having to expend as much on advertising is clear. Additionally, the ability for deal givers to make some profit from having met and processed information on eager buyers also adds to the efficiency and profitability of the car sales industry.

To further illustrate the applicability of the present invention in creating efficiency in the car sales industry consider the fourth scenario discussed above wherein a given dealer does not have cars that are suited to an individuals' credit score. In this scenario, a customer comes to a dealer and qualifies for financing. However, the bank where the paper is hung calls to advise that the customer only qualifies for a car having low actual car value (ACV), low mileage, or a newer car (e.g., less than 5 years old or less than 60,000 miles). The deal giver in this scenario does not have a car that meets the banks prerequisites and stands to lose the customer.

Specifically, for example, a customer may walk through the doors of a new car dealership that only carries cars in the range of $20,000 to $50,000. The customer's credit score is 580 beacons and the callback from the bank comes in at a maximum amount financed of $15,000 for a car equal to or less than 5 years old and having less than 60,000 miles. Seeing that he does not have anything in his inventory to consummate a sale, the deal giver provides the customer information and financing information to the central registry for the posting of a lead. A deal seeker procures the lead, contacts the eager buyer and gets them to his lot. At this point he may put them in a car they qualify for or get a better callback from a bank in his network and/or get a larger amount financed and sell the customer a more expensive car. After the customer drives off the lot, the deal is done and the specifics of the deal are reported to the central registry for processing of remuneration to the central registry and deal giver as discussed above.

Turning to the final scenario discussed above, it is becoming more common that eager car buyers will be a first time car buyer, have a limited credit history, and/or have a tax-id but no social security number. For example, statistics show that an ever growing number of immigrants are entering the country to work. These individuals have jobs but no social security number. Instead, they have a Tax ID. Presently, some car dealerships are ill-equipped to do business with an individual having a Tax ID. Rather than lose all profit from having to turn away a customer with a nice paying job that pays his bills and qualifies for financing based on his Tax ID bureau report, the deal giver can provide the customers information to the central registry for the posting of a lead for deal seekers that handle this type of customer. This lead will be particularly advantages for buy-here-pay-here dealerships because they provide in-house financing. Thus, even in this situation, the present invention will create efficiency in the car sales market by allowing all car dealers (including buy-here-pay-here dealerships) meeting with prospective buyers to profit by providing or securing a hot lead and allowing car dealers being particularly suited for certain types of buyers to acquire hot leads for eager buyers. At the end of the day even the stale leads are valuable since they could be a "Buy-Here-Pay-Here's" dream niche. Every inefficiency in the market is tackled.

Also, it should be evident that when dealing with the personal or financial information of a customer, all applicable laws and regulations regarding privacy should be observed. In accordance with the present invention as it relates to a market for automotive financing leads, the present inventor contemplates an informed consent through the signing of a limited waiver executed at the deal giver dealership at the time of submitting an application for credit approval and financing. The waiver will authorize the dealership to disclose financial and credit information about the buyer to other dealerships as well as preferably including a waiver of the "Do Not Call" Registry so the dealers may contact the buyer via telephone to speed the transaction.

Further, by law, dealerships are required to maintain reports of the individuals for whom credit reports are pulled. Therefore, it is contemplated that the dealers will also sign waivers to hold harmless the central registry for receiving and providing personal information transmitted to the central registry or accessed from the central registry.

The above described embodiments were for illustrative purposes of presently preferred embodiments. However, one of ordinary skill in the art armed with the present specification should readily appreciate that the methods and systems described herein may be configured for use in a vast array of fields to achieve a marketplace for supplying leads to others more suited or willing to do business with the specific customer.

In sum, those skilled in the art will appreciate that various adaptations and modifications of the above-described preferred embodiments can be configured without departing from the scope and spirit of the invention. Therefore, it is to be understood that, within the scope of the appended claims, the invention may be practiced other than as specifically described herein.

What is claimed is:

1. An anonymous dealer to dealer sales lead system for the car sales industry that allows car dealers that cannot or will not provide financing to a prospective customer based upon the prospective customers credit rating or financial qualifications to anonymously offer that prospective customer to other car dealers who after receiving the financial qualifications or credit rating of the prospective customer can anonymously buy, bid, or bargain for the identity or contact information for the prospective customer comprising;

a central registry for receiving credit information or financial qualifications of customers from lead sellers and for soliciting bids or offers from lead buyers who may be willing to attempt to sell or finance a car to at least one of said customers; wherein said central registry requires a subscription for participation by car dealers as lead sellers or lead buyers; said central registry configured for receiving customer leads from lead sellers and broadcasting the customer leads to lead buyers for participation in an auction or sale of customer leads while maintaining the anonymity of customers to prevent lead buyers from transacting business directly with the customers and maintaining the anonymity of the lead sellers and lead buyers to prevent lead buyers from transacting business directly with the lead sellers to the detriment of the other lead buyers attempting to bid on or buy leads;

a deal giver user interface for use by a car dealership lead seller for communicating buyer data about a prospective customer of said car dealership to a central registry, said buyer data including a credit report rating and a geographical location of said prospective customer, whereby a seller dealing with the prospective customer that he cannot or does not intend to transact business with may still profit by identifying an alternate dealer for the prospective customer willing to do business with that prospective customer and receiving a fee or commission on any consummated sale between the prospective customer and the alternate dealer;

said central registry comprising a server configured to store at least a portion of said buyer data and a database of anonymous leads including the credit report rating and the geographical location of said prospective customer, wherein said central registry keeps the contact information for the customer confidential pending the conclusion of the lead bidding or selling process and keeps the identity of the lead sellers and lead buyers confidential to prevent dealerships from dealing directly with one another; and a deal seeker user interface for use by a car dealership lead buyer for viewing at least one of said anonymous leads from said central registry and communicating an offer to purchase buyer data sufficient to identify said prospective customer; whereby a lead buyer may purchase a lead knowing that the customer is both in the market for the lead buyer's product and also a customer having the financial qualifications sufficient to attempt to transact business with.

* * * * *